March 14, 1961  J. T. GERMAIN  2,974,656
FUEL PREHEATING DEVICE FOR INTERNAL COMBUSTION ENGINES
Filed Oct. 9, 1959
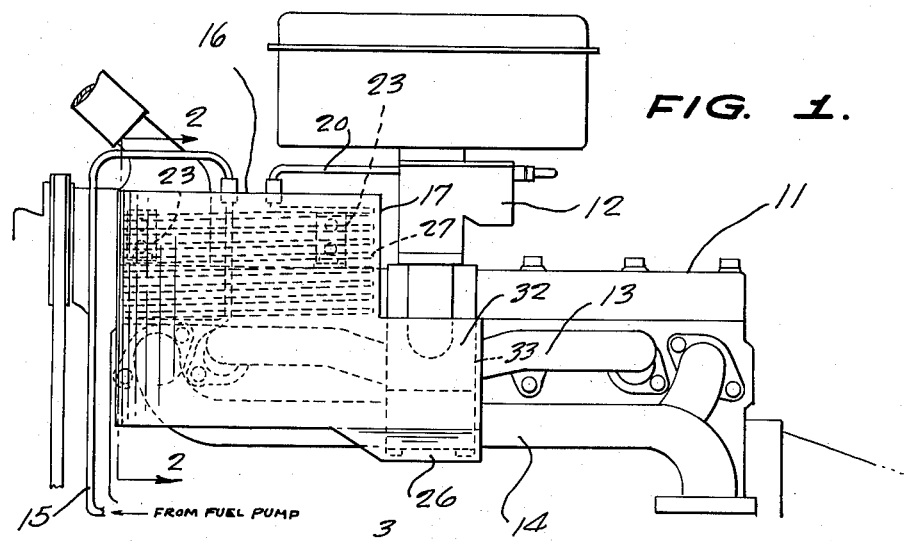
FIG. 1.
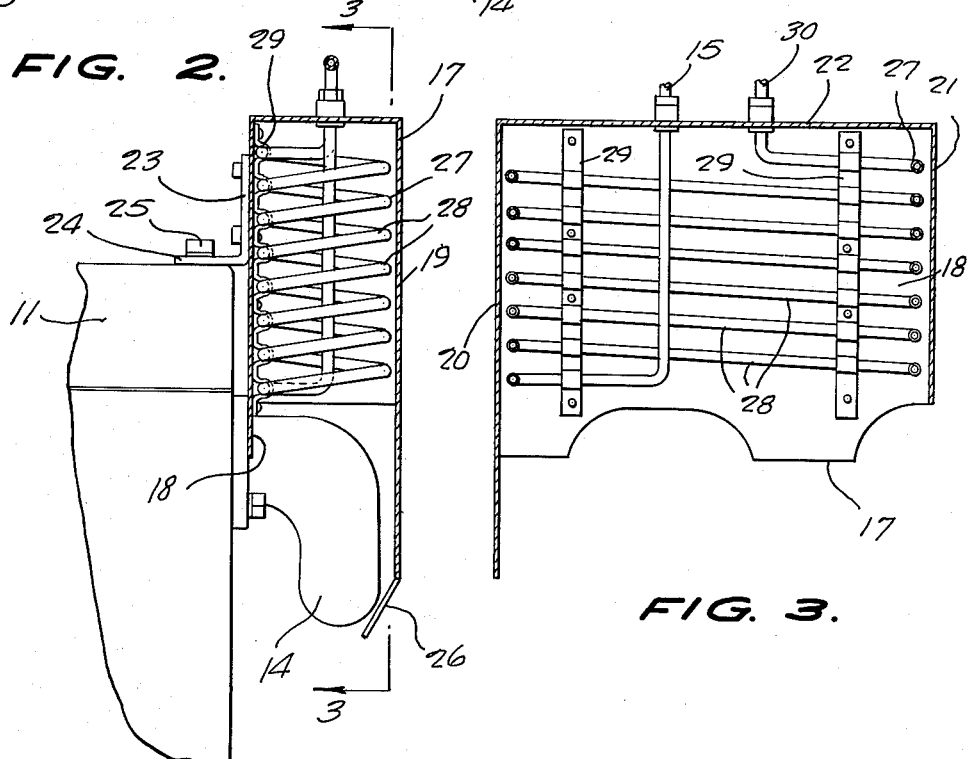
FIG. 2.
FIG. 3.
INVENTOR.
JOSEPH T. GERMAIN,
BY
McMorrow, Berman & Davidson
ATTORNEYS.

United States Patent Office 2,974,656
Patented Mar. 14, 1961

2,974,656

FUEL PREHEATING DEVICE FOR INTERNAL COMBUSTION ENGINES

Joseph T. Germain, 16766 Brookport St., Covina, Calif.

Filed Oct. 9, 1959, Ser. No. 845,504

3 Claims. (Cl. 123—122)

This invention relates to fuel heaters for internal combustion engines, and more particularly to a fuel preheating device particularly designed to utilize heat from the exhaust manifold of an internal combustion engine to preheat the fuel furnished to the engine.

The main object of the invention is to provide a novel and improved fuel preheating device for an internal combustion engine, said device being simple in construction, being easy to install, and providing a substantial saving in the fuel consumed by the engine.

A further object of the invention is to provide an improved fuel preheater for an internal combustion engine, said preheater being inexpensive to fabricate, being durable in construction, being compact in size, and requiring no substantial modification of an engine on which it is installed, whereby it may be readily installed on existing internal combustion engines with a minimum amount of labor and expense.

Further objects and advantages of the invention will become apparent from the following description and claims, and from the accompanying drawings, wherein:

Figure 1 is a fragmentary side elevational view of an internal combustion engine for a motor vehicle provided with an improved fuel preheater constructed in accordance with the present invention.

Figure 2 is an enlarged transverse vertical cross sectional view taken on the line 2—2 of Figure 1.

Figure 3 is a longitudinal vertical cross sectional view taken on the line 3—3 of Figure 2.

Referring to the drawings, 11 generally designates a conventional internal combustion engine, for example, of the type employed in motor vehicles, the engine being provided with the usual carburetor 12, the intake manifold 13 and the exhaust manifold 14. Fuel is supplied to the intake manifold 13 through the carburetor 12 from a fuel supply line 15 leading from the outlet of the vehicle fuel pump, not shown.

Designated generally at 16 is a fuel preheating device according to the present invention, the device comprising a vertical, elongated housing 17 having the respective longitudinal side walls 18 and 19, the end walls 20 and 21 and the top wall 22. The bottom of the housing is open, and as will be presently explained, the housing is arranged so that it receives a substantial portion of the exhaust manifold 14 in its bottom so as to receive heat therefrom.

As shown in Figure 2, an angle bracket 23 is secured to the upper portion of each end of the side wall 18 and the horizontal flange 24 of the bracket is supportingly engaged on the top of the engine 11 and is secured thereto by one of the cylinder head bolts 25. The outer side wall 19 extends in front of the exhaust manifold 14, as is clearly shown in Figure 2, and is shaped to house a substantial portion of the exhaust manifold, being provided with an inturned bottom flange element 26 which engages beneath and forwardly of the exhaust manifold in the manner illustrated in Figure 2.

Designated generally at 27 is a heat exchanger comprising a coiled conduit formed with a plurality of horizontally elongated turns 28, said turns being disposed one above the other and being arranged longitudinally in the upper portion of the housing 17. The heat exchanger 27 is secured to the vertical longitudinal side wall 18 by strap members 29 which are formed with loops in which the respective turns 27 are received, the strap members 29 being fastened to the vertical side wall 18 so as to rigidly clamp said loops to said side wall. Thus, the heat exchanger 27 is rigidly fastened inside the housing 17 in the manner illustrated in Figures 2 and 3, respective strap members 29 being employed adjacent the respective ends of the turns so as to support the turns adjacent their respective opposite ends, as is clearly illustrated in Figure 3.

The heat exchanging conduit 27 is connected between the fuel supply line 15 and the fuel conduit 30 extending to the carburetor 12, whereby the heat exchanging conduit 27 is interposed between the fuel supply line 15 and said carburetor. Since the turns 28 are arranged in the housing 17 in a position to receive heat from the exhaust manifold 14, and from the engine block itself, a substantial amount of heat is delivered to the fuel passing through the heat exchanger, whereby the fuel is preheated to an elevated temperature before it enters the carburetor 12. This greatly facilitates the mixing of the fuel in the carburetor and the subsequent firing of the fuel mixture in the engine, resulting in substantially improved fuel economy and greatly improved engine performance, as over that which is normally obtainable without the use of a fuel preheater.

It will be noted that due to the horizontal longitudinal elongation of the heat exchanger, and due to the fact that the turns 28 thereof overlie a substantial portion of the exhaust manifold 14, and are substantially enclosed therewith in the housing 17, that the heat transfer from the exhaust manifold to the fuel circulating through the turns is highly efficient, and that the heat from the exhaust manifold, which would otherwise be wasted, is efficiently and effectively employed to preheat the engine fuel. Furthermore, due to the fact that the unit is vertical and is elongated in a longitudinal direction, the unit is relatively thin and may be easily mounted alongside and adjacent to the upper portion of the usual internal combustion engine employed in a motor vehicle.

As shown in Figure 1, the housing 19 is formed with an extension portion 32 which extends around the fuel heating housing 33 normally employed adjacent the carburetor 12, whereby said auxiliary housing portion 33 is also substantially enclosed with the heat exchanger 27 in the housing 17 of the preheater device. This serves as a further means of channeling heat from the exhaust manifold 14 to the heating box 33, while the heat is being simultaneously transmitted to the heat exchanger coils 28.

While a specific embodiment of an improved fuel preheater for an internal combustion engine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, an internal combustion engine having a vertical heated wall portion, a housing member, bracket means connecting said housing member to said vertical heated wall portion, a heat exchanger vertically disposed in said housing, said heat exchanger comprising a coiled conduit formed with a plurality of horizontally elongated substantially horizontal turns disposed one above the other, and means clampingly securing said turns to said housing member adjacent said vertical heated wall portion, said conduit being connected between the fuel line and the intake manifold of the engine, whereby to preheat the fuel supplied to the intake manifold.

2. In combination, an internal combustion engine having an exhaust manifold and having a vertical heated wall portion adjacent said exhaust manifold, a housing member, bracket means secured to one wall of said housing member and connecting said housing member to said vertical heated wall portion adjacent the exhaust manifold, said housing member being open at its bottom end and being mounted over the exhaust manifold to receive heat therefrom, a heat exchanger vertically disposed in said housing member, said heat exchanger comprising a coiled conduit formed with a plurality of horizontally elongated substantially horizontal turns disposed one above the other, and means clampingly securing said turns to said wall of said housing member, said conduit being connected between the fuel line and the intake manifold of the engine, whereby to preheat the fuel supplied to the intake manifold.

3. In combination, an internal combustion engine having an exhaust manifold and having a vertical heated wall portion adjacent said exhaust manifold, a vertical, elongated housing, bracket means secured to one vertical side wall of said housing and connecting said housing to said vertical heated wall portion adjacent to and in overlying relation to the exhaust manifold, said housing receiving a substantial portion of the exhaust manifold in its bottom end, a heat exchanger vertically disposed in said housing, said heat exchanger comprising a coiled conduit formed with a plurality of horizontally elongated substantially horizontal turns disposed one above the other in the upper portion of the housing and extending longitudinally in said housing, and means clampingly securing said turns to said vertical side wall of the housing, said conduit being connected between the fuel line and the intake manifold of the engine, whereby to preheat the fuel supply to the intake manifold.

References Cited in the file of this patent
UNITED STATES PATENTS

| | | |
|---|---|---|
| 1,220,039 | White | Mar. 20, 1917 |
| 1,632,784 | Blair | June 2, 1927 |
| 1,886,553 | Kercher | Nov. 8, 1932 |
| 2,077,764 | Liles | Apr. 20, 1937 |